US012342118B1

(12) United States Patent
Susini et al.

(10) Patent No.: US 12,342,118 B1
(45) Date of Patent: Jun. 24, 2025

(54) COMPACT SPEAKER ENCLOSURE WITH MODULAR EXTERNAL DESIGN

(71) Applicant: SAGEMCOM BROADBAND SAS, Bois-Colombes (FR)

(72) Inventors: Dominique Susini, Bois-Colombes (FR); Jérémy Stangalini, Bois-Colombes (FR); Radu Nedelcu, Bois-Colombes (FR); Gilles Bourgoin, Bois-Colombes (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 0 days.

(21) Appl. No.: 18/990,848

(22) Filed: Dec. 20, 2024

(30) Foreign Application Priority Data

Dec. 22, 2023 (FR) ...................................... 2315183

(51) Int. Cl.
*H04R 1/02* (2006.01)
*H04R 7/16* (2006.01)

(52) U.S. Cl.
CPC ............... *H04R 1/025* (2013.01); *H04R 7/16* (2013.01); *H04R 2201/02* (2013.01)

(58) Field of Classification Search
CPC ....... H04R 1/025; H04R 7/16; H04R 2201/02
USPC .......................................................... 381/186
See application file for complete search history.

(56) References Cited

U.S. PATENT DOCUMENTS 2,036,832 A 4/1936 Scheldorf
7,806,227 B2 * 10/2010 Wang .................... H04R 1/021 381/334
12,082,377 B2 * 9/2024 Rahim .................. H04R 1/025
12,114,128 B2 * 10/2024 Lastrucci ........... G06K 19/0723
2018/0035210 A1 2/2018 Wang et al.

FOREIGN PATENT DOCUMENTS

CN 219875976 U 10/2023
JP 2009253591 A 10/2009

* cited by examiner

*Primary Examiner* — Sean H Nguyen
(74) *Attorney, Agent, or Firm* — MUNCY, GEISSLER, OLDS & LOWE, P.C.

(57) ABSTRACT

A sound box includes two half-boxes assembled with each other and each comprising an inner half-partition, the sound box being arranged so that, when it is assembled, the two half-boxes are positioned head-to-tail so that the first end of each half-box is positioned at the second end of the other half-box, and the inner half-partitions extend in line with each other to form an inner partition of the sound box that defines, inside the sound box, two acoustic chambers each intended to accommodate one of the two loudspeakers.

18 Claims, 5 Drawing Sheets

COMPACT SPEAKER ENCLOSURE WITH MODULAR EXTERNAL DESIGN

The invention relates to the field of acoustic speaker enclosures.

BACKGROUND

An acoustic speaker enclosure, and in particular a smart and/or portable speaker enclosure, typically comprises a “technical part”, also called “sound box”, inside which, one or more loudspeakers are integrated. The sound box is waterproof and defines a technical volume necessary for the implementation of the technical functions of the audio part of the speaker enclosure, such as the acoustic volume, the connections for bringing the electrical audio signals to the loudspeakers, etc.

The sound box can also be used as an outer shell, which thus, allows both to protect the various components of the speaker enclosure against external aggressions, but also to give the speaker enclosure a certain aesthetic appearance.

The aesthetic appearance of the speaker enclosure cannot therefore, be modified without modifying the sound box, which requires designing a new sound box for each new speaker enclosure model.

In order to be able to easily modify the appearance of the speaker enclosure (customisation), it is known to cover the sound box with a covering (for example, a lid, a textile). In general, the covering serves essentially to conceal electronic boards that are integrated on or in the sound box and this, in a way that is specific to said sound box. The shape of the covering is therefore, specific to each sound box. The covering therefore, allows only minor modularity of the appearance of the speaker enclosure, via changes in color and/or texture of the covering, but does not allow the shape of the speaker enclosure to be changed.

It is also known to design different speaker enclosures from the same sound box (and from its electronic board(s)), by integrating it into different types of covering. This solution causes additional technical constraints (for example related to the fastening of the covering on the sound box or to the addition of additional parts to allow adaptation with a new shape) and involves increasing the external dimensions of the speaker enclosure. For example, the original speaker enclosure is concealed in a “shell” larger than the speaker enclosure to change the appearance, and in particular, the shape of the final product.

AIM

The invention relates to a sound box:

- allowing to easily modify the appearance of the speaker enclosure incorporating said sound box;
- having a maximum compactness;
- with optimal acoustic performances.

SUMMARY

In order to achieve this aim, a sound box is proposed, intended to form an acoustic speaker enclosure which may also comprise two loudspeakers, the sound box comprising two half-boxes assembled with each other, each half-box comprising a first end and a second end opposite along a first dimension, the first end having a first height, along a second dimension perpendicular to the first dimension, which is less than a second height of the second end along said second dimension, each half-box further comprising an inner half-partition, the sound box being arranged so that, when it is assembled, the two half-boxes are positioned head-to-tail so that the first end of each half-box is positioned at the second end of the other half-box, and the inner half-partitions extend in line with each other to form an inner partition of the sound box that defines inside the sound box, two sound boxes each intended to accommodate one of the two loudspeakers.

The sound box, obtained by assembling the two half-boxes, has numerous advantages.

It has an external shape that is easily integrated into outer shells of different shapes, without adding additional parts to allow adaptation to these different shells.

Further, the inner half-partitions of the half-boxes, forming the inner partition of the box, allow to define acoustic chambers inside the box, each having an optimised volume, and thus, to obtain a compactness and maximum acoustic performances.

The head-to-tail assembly allows to stiffen the box, which is thus, more resistant to vibrations.

In addition, a sound box as previously described is proposed, in which each half-box comprises two lateral faces extending opposite each other and parallel to the first dimension and to the second dimension, each lateral face of each half-box having a triangular shape, the sound box thus, comprising two lateral faces of rectangular shape and each formed by two lateral faces of the two half-boxes.

In addition, a sound box as previously described is proposed, in which each half-box is manufactured by moulding, said half-box being arranged so that its mould-release takes place along a mould-release direction perpendicular to a main face of the half-box from which the two lateral faces of the half-box extend.

In addition, a sound box as previously described is proposed, in which, for each half-box, the outer wall of each lateral face is inclined towards the inside of the half-box to form a draft angle between said outer wall and an axis perpendicular to said main face.

In addition, a sound box as previously described is proposed, in which, when the sound box is in a nominal position, the inner wall extends in a horizontal plane and thus, defines an upper acoustic chamber and a lower acoustic chamber, an upper face of the sound box being arranged so that a diaphragm of the loudspeaker of the upper acoustic chamber can extend at said upper face, and a front face of the sound box being arranged such that a diaphragm of the loudspeaker of the lower acoustic chamber can extend at said front face.

In addition, a sound box as previously described is proposed, in which one of the half-boxes comprises two faces each arranged so that a diaphragm of one of the loudspeakers can extend to said face.

In addition, a sound box as previously described is proposed, comprising, for each loudspeaker, a face arranged so that a diaphragm of said loudspeaker can extend at said face, said face comprising an opening through which the diaphragm can be in acoustic communication with the outside of the box, an outer wall of said face further comprising a rib which extends around the opening so as to provide acoustic guidance of acoustic waves produced by said diaphragm.

In addition, a sound box as previously described is proposed, comprising a seal, made of compressible material, arranged at the joint of the half-boxes when those are assembled, the seal comprising a contour portion positioned between free edges of faces of the half-boxes, and an inner portion positioned between free edges of the inner half-partitions, so that the seal ensures a sealing for the box at the joint of the two half-boxes, and at the two acoustic chambers.

In addition, a sound box as previously described is proposed, comprising a front face having an outer wall comprising a receiving surface arranged to receive an electronic board, and first fastening means arranged to fasten the electronic board to said outer wall.

In addition, a sound box as previously described is proposed, further comprising second fastening means arranged to cooperate with third fastening means of an outer shell to fasten said outer shell to the sound box.

In addition, a sound box as previously described is proposed, comprising, a front face having lateral edges on which the second fastening means are formed, outer walls of the lateral faces of the sound box further comprising grooves which extend from the second fastening means and which are arranged to prevent the third fastening means of the outer shell from coming into contact with the lateral faces of the sound box, and to stiffen said sound box.

In addition, a speaker enclosure is proposed, comprising the sound box as previously described, as well as the two loudspeakers.

In addition, a speaker enclosure as previously described is proposed, which comprises the sound box as previously described, the speaker enclosure further comprising the outer shell.

In addition, a speaker enclosure as previously described is proposed, the outer shell comprising a frame forming a rear face, a lower face, and lateral faces of the speaker enclosure, and a lid forming a top face and a front face of the speaker enclosure.

In addition, a speaker enclosure as previously described is proposed, the speaker enclosure comprising a sound box as previously described, the speaker enclosure also comprising the electronic board, the electronic board comprising interface components with a user.

In addition, a speaker enclosure as previously described is proposed, in which the interface components comprise an actuatable component, and in which the speaker enclosure comprises a button arranged to actuate the actuatable component, the button comprising a deformable surface formed on the outer shell and comprising a resting area arranged so that when the user presses the resting area, this one sinks and allows to actuate the actuatable component to implement a predefined function.

In addition, a speaker enclosure as previously described is proposed, in which the interface components further comprise a light indicator indicating a position of the button on the outer shell, and in which the resting area comprises a central portion and two end portions along a first dimension, the two end portions having a height along a second dimension perpendicular to the first dimension greater than that of the central portion, the speaker enclosure being arranged so that an orthogonal projection of the light indicator on the outer shell is positioned between the two end portions.

In addition, a speaker enclosure as previously described is proposed, in which the deformable surface is obtained by a cutout made in the outer shell, the deformable surface comprising a tab having one end connected to the rest of the outer shell and a free end from which the resting area extends.

The invention shall be best understood in the light of the following description of a particular, non-limiting embodiment of the invention.

BRIEF DESCRIPTION OF THE DRAWINGS

Reference will be made to the attached drawings, among which.

DETAILED DESCRIPTION

Figure 1:
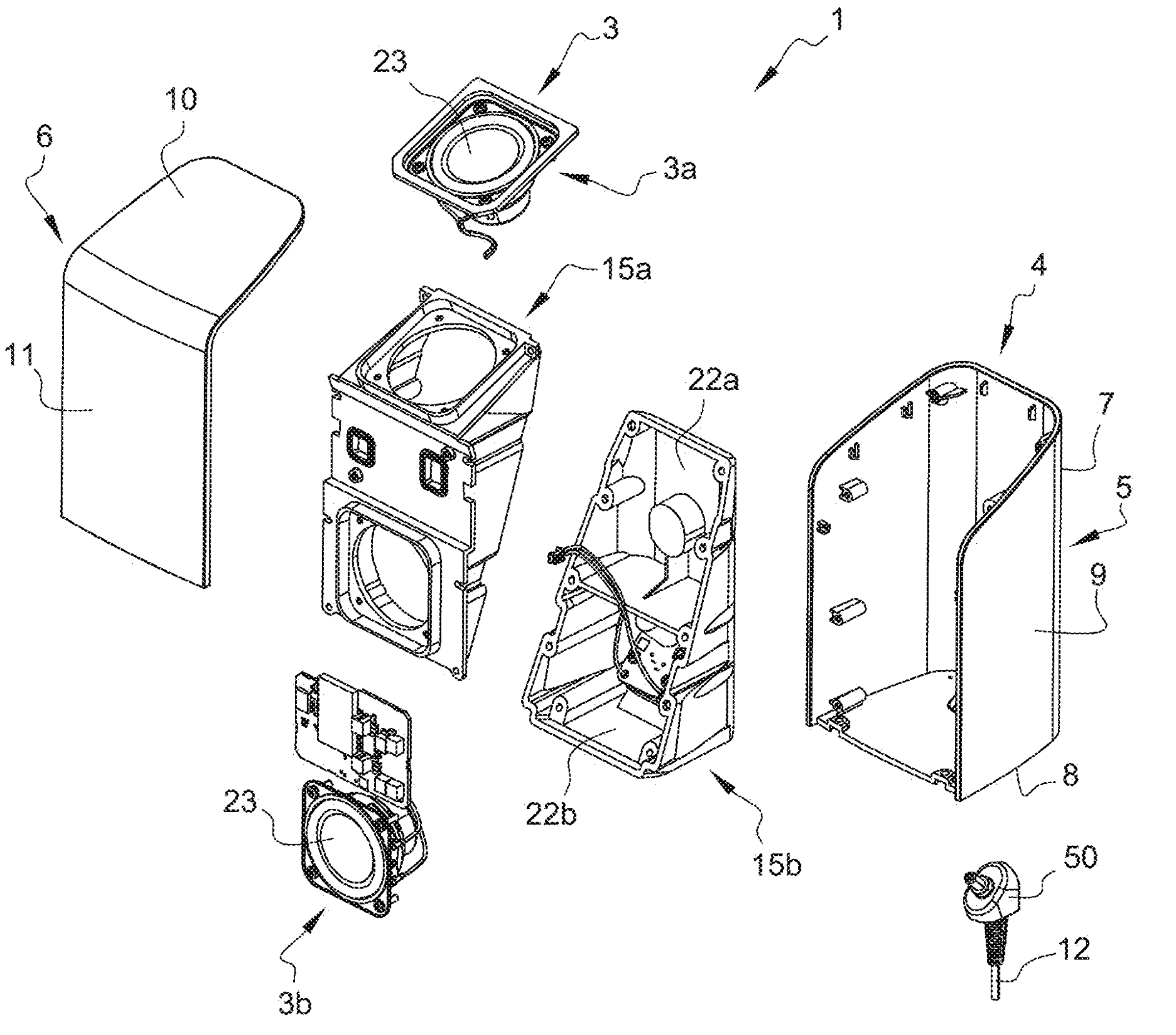
FIG. 1 is an exploded and perspective view of the acoustic speaker enclosure.
Figure 2:
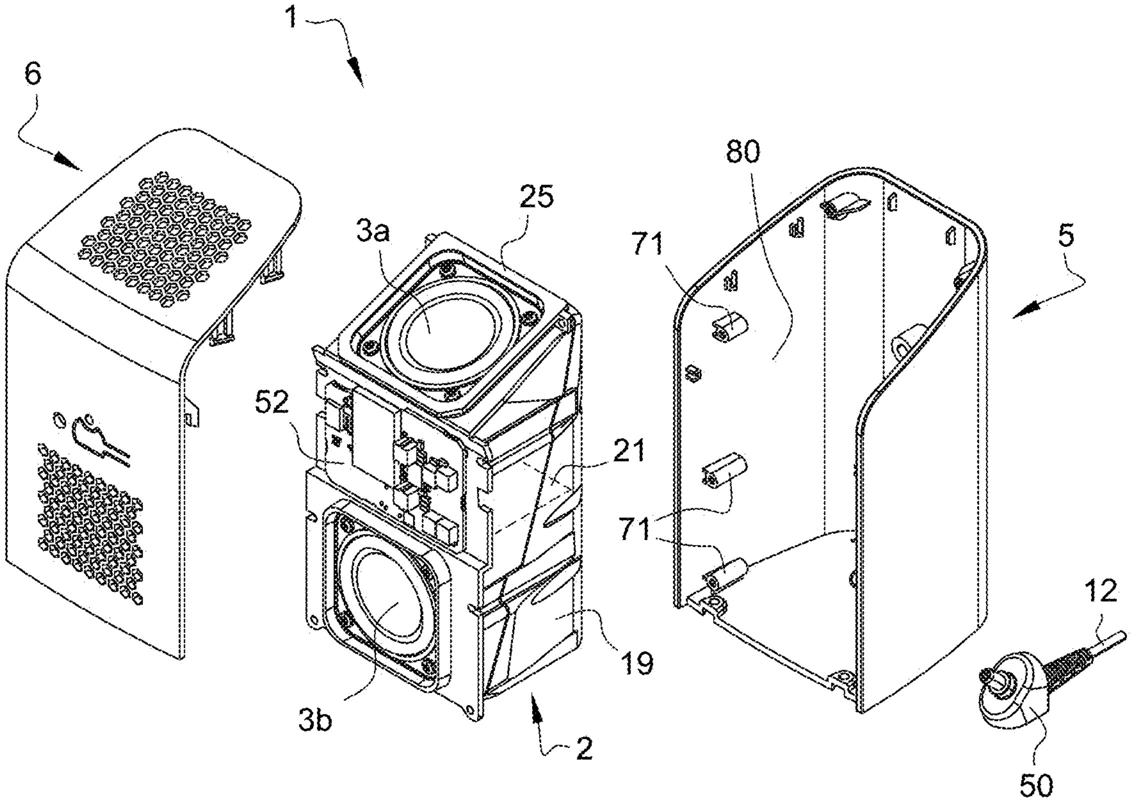
FIG. 2 is a perspective view of box, of the lid and of the outer shell frame, unassembled.

With reference to FIGS. 1 and 2, the acoustic speaker enclosure 1 is a "satellite" speaker enclosure, which is intended to be connected by a radio frequency link to an audio source such as a set-top box for example (or STB). The set-top box can be an "improved" set-top box integrating itself a speaker enclosure. The audio source can also be, for example, a smart speaker enclosure.

The speaker enclosure 1 is designed so that its appearance can be easily modified, while preserving the technical characteristics necessary for its proper functioning.

The speaker enclosure 1 comprises a sound box 2, two loudspeakers 3 integrated in the sound box 2, and an outer shell 4.

The outer shell 4 comprises a frame 5 and a lid 6. The frame 5 forms a rear face 7, a lower face 8 and lateral faces 9 of the shell 4 and of the speaker enclosure 1. The lid 6 forms a top face 10 and a front face 11 of the shell 4 and the speaker enclosure 1. The sound box 2 is positioned inside the volume defined by the shell 4.

The shell 4 therefore, forms an outer casing and the box 2 forms an inner casing of the speaker enclosure 1.

The speaker enclosure 1 is powered by an electrical power supply cable 12 which is connected to the speaker enclosure 1 at a corner defined by the intersection of the rear face 7 and the bottom face 8 of the shell 4 and therefore, of the speaker enclosure 1.

The speaker enclosure 1 is designed to operate in a nominal manner, without damaging the cable 12, either by being positioned so that its bottom face 8 (or feet of its bottom face) rests on a horizontal flat surface (a piece of furniture for example), or by being positioned such that its rear face 7 extends against a vertical flat surface (a wall for example).

Here, when a term relating to positioning and applied to the speaker enclosure 1 or to the box 2 (for example, front, rear, upper, lower, inner, external, horizontal, etc.) is used, this term must be interpreted by considering that the speaker enclosure 1 is positioned according to one of these two positions, and therefore, that the speaker enclosure 1 and the box 2 are each in a nominal position.

Figure 3:
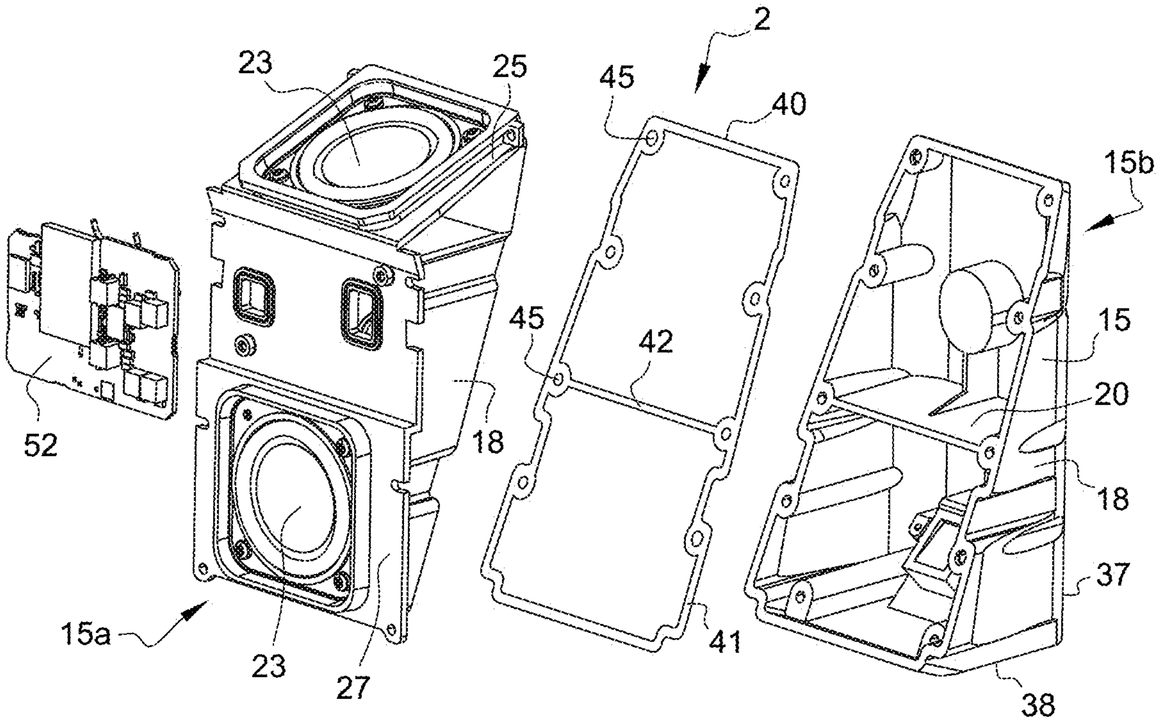
FIG. 3 is a perspective view of the two unassembled half-boxes, and the flat joint.
Figure 4:
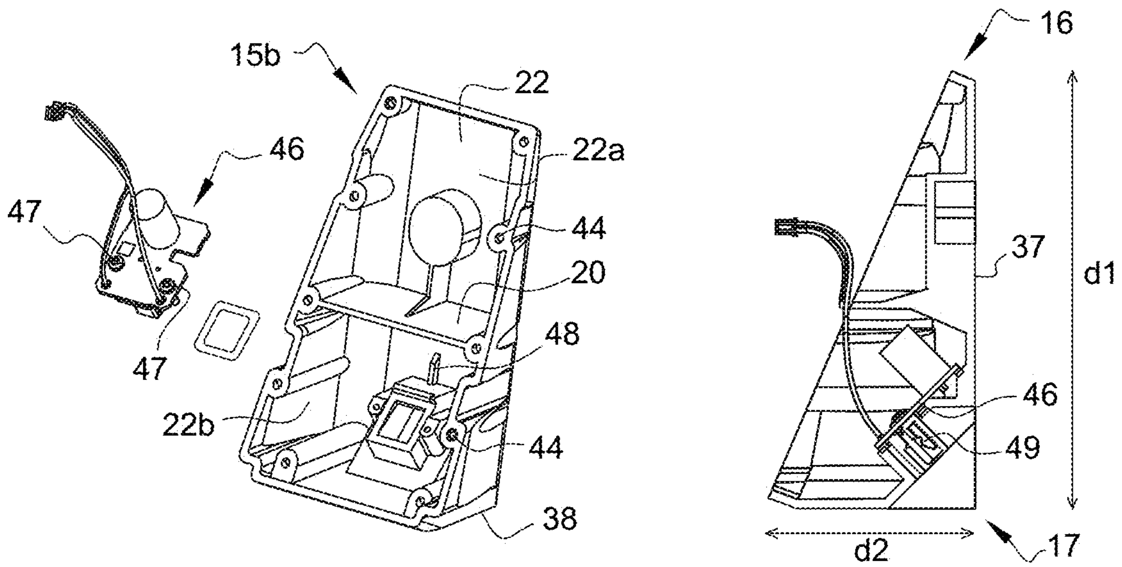
FIG. 4 is an exploded perspective view of the rear half-box, and a sectional view of said half-box along a plane parallel to its lateral faces.
Figure 5:
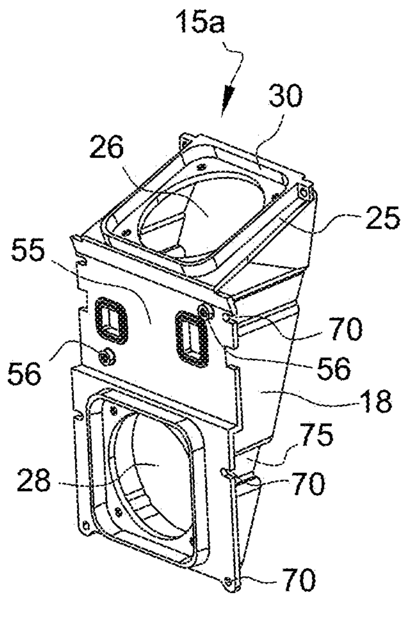
FIG. 5 is a perspective view of the front half-box.

Attention is first paid to the sound box 2, with reference to FIGS. 3 to 5.

The sound box 2 includes two half-boxes 15: a front half-box 15*a* and a rear half-box 15*b*.

Each half-box 15 comprises a first end 16 and a second end 17 opposite along a first dimension d1 of the half-box 15, the first end 16 having a first height, along a second dimension d2 of the half-box 15 perpendicular to the first dimension d1, which is less than a second height of the second end 17 along said second dimension d2.

When the box 2 is assembled, the two half-boxes 15*a*, 15*b* are positioned head-to-tail so that the first end 16 of each half-box 15 is positioned at the second end 17 of the other half-box 15 (and vice versa).

Each half-box 15 comprises two lateral faces 18 extending facing each other and parallel to the first dimension d1 and to the second dimension d2. Each lateral face 18 of each half-box 15 has a triangular shape. The sound box 2 thus comprises, two lateral faces 19 (visible in FIG. 2) of rectangular shape and each formed by two lateral faces 18 of the two half-boxes 15*a*, 15*b*.

From these two triangular cross-section half-boxes 15, a box 2 of parallelepiped general shape is thus obtained.

Each half-box 15 further comprises an inner half-partition 20.

When the box 2 is assembled, the inner half-partitions 20 extend in line with each other to form an inner partition 21 (in dotted lines on FIG. 2) of the sound box 2 which defines inside the sound box 2 two acoustic chambers 22 each intended to receive one of the two loudspeakers 3.

Here, when the sound box 2 is in a nominal position, the inner wall 21 extends into a horizontal plane and thus, defines an upper chamber 22*a* and a lower chamber 22*b*.

There is therefore, a common volume defined in the box 2 and separated by an inner partition 21. A box 2 is thus obtained, comprising two acoustic chambers 22 defined in the box, from only two parts (the two half-boxes 15*a*, 15*b*).

This therefore, limits both the number of parts and the volume lost inside the box 2.

This solution is similar, in principle, to a solution in which there would be a half-shell and a lid. However, in this case, there is a difference in rigidity between these two parts. The half-shell can be reinforced but the lid has a substantially flat general shape and therefore, deforms easily when subjected to vibrations, during the functioning of the speaker enclosure.

Here, on the contrary, the box 2, with a diagonal joint plane, does not have this weakness.

The particular configuration in two head-to-tail triangular half-boxes 15 allows a balancing of the mechanical stresses undergone by the two half-boxes 15, due to the acoustic vibrations during the functioning of the enclosure 1.

Indeed, the areas of a half-box 15 having “short” or “narrow” walls (typically at its tip: first end 16) have the effect of constraining the areas having “longer” or “wider” walls of the other half-box (typically at its base: second end 17) and vice versa. Thus, as soon as the speaker enclosure 1 is functioning, this configuration has the advantage of preventing deformations and potential vibrations of the acoustic chamber 2. In other words, the head-to-tail assembly eliminates the difference in behaviour between the two half-boxes 15.

The head-to-tail triangular cross-sections therefore, allow each half-box 15 to absorb the forces of the other; there are therefore, two parts resistant to deformations related to the vibrations.

Each loudspeaker 3 of the speaker enclosure 1 is therefore, mounted in a sealed acoustic volume. The sealing of each volume allows each loudspeaker 3 to function optimally (that is with optimal sound rendering), avoiding acoustic short circuits that could degrade the sound quality of the speaker enclosure 1.

To form sealed volumes, the use of the inner partition 21 is particularly advantageous compared to solutions of the prior art which provide, for each sealed volume, to be formed by means of independent compartments having separate walls.

Indeed, such independent compartments require assembly arrangements that require to have empty spaces outside the box (that is between the outer surface of the box and the shell), thus increasing the overall volume of the speaker enclosure for the same effective volume. Further, each compartment is formed by a separate wall having a certain thickness, which has the disadvantage of reducing the effective volume of the speaker enclosure.

The use of the inner partition 21 therefore, allows to increase the acoustic volume associated with each loudspeaker to optimise the acoustic rendering of the speaker enclosure and/or to reduce the total volume of the sound box so as to minimise the size of the speaker enclosure.

The inner partition 21 is arranged so as to delimit distinct volumes defined so as to reduce the force necessary for the movement of the diaphragm of each loudspeaker. Here, each acoustic chamber 22 has a volume of 0.2 L, which is an optimal volume determined by taking into account the size of the speaker enclosure 1 and the characteristics of the chosen loudspeakers. The volume of 0.2 L is therefore, specific to the loudspeakers 3 presented here. Other loudspeakers can be associated at different optimal volumes.

In the present example, the speaker enclosure 1 comprises two loudspeakers 3, so that a single horizontal partition 21 is provided inside the box 2, approximately at mid-height, so as to delimit two sealed acoustic volumes of 0.2 L respectively associated with the two loudspeakers 3. In other embodiments (not described), the speaker enclosure 1 may comprise a larger number of loudspeakers 3, and the number of inner partitions 21 of the box 2 will be adjusted accordingly. Also note that the inner half-partition(s) and therefore, the inner partition(s), are not necessarily horizontal and could be inclined, or even vertical.

Here, however, as just seen, the inner wall 21 delimits an upper acoustic chamber 22*a* and a lower acoustic chamber 22*b*.

It can be seen that one of the half-boxes 15, in this case the front half-box 15*a*, here comprises two faces, each arranged so that a diaphragm of one of the loudspeakers can extend at said face: the upper face 25 and the front face 27 of the half-box 15*a*. The two loudspeakers 3*a*, 3*b* are therefore positioned on a same half-box 15, in this case the front half-box 15*a*.

The top face 25 of the sound box 2, which is also the top face of the half-box 15*a*, is arranged so that the diaphragm 23 of the loudspeaker 3*a* of the top chamber 22*a* can extend at said top face 25. The frame of the loudspeaker 3*a* here, is fastened to the upper face 25, which comprises an opening 26 through which the diaphragm 23 can be in acoustic communication with the outside of the box 2.

The front face 27 of the sound box 15*a* is arranged so that a diaphragm 23 of the loudspeaker 3*b* of the lower chamber 22*b* can extend at said front face 27. The frame of the loudspeaker 3*b* here, is fastened to the front face 27, which comprises an opening 28 through which the diaphragm 23 can be in acoustic communication with the outside of the box 2.

The configuration described is in fact particularly well adapted to the particular case where the sound box 2 comprises a loudspeaker pointing upwards ("up-firing") and a front loudspeaker pointing forwards.

The angle between the longitudinal axes of these two loudspeakers allow, for example, to obtain the elevation imposed by the Dolby™ ATMOS™ technology. Indeed, this technology requires having two loudspeakers with a specific angle between the two so as to broadcast the sound on a horizontal plane as well as on a vertical plane.

The grouping of the two loudspeakers 3*a*, 3*b* in the front half-box 15 allows to compact the speaker enclosure 1 as much as possible, while respecting the principle of separation of the acoustic volumes (for example, as is the case here, a sealed acoustic volume of 0.2 L per loudspeaker 3).

Each of the upper face 25 and front face 27 comprises a rib 30 that extends around the opening 26, 28, perpendicularly to the outer wall of said face 25, 27.

Each rib 30, which extends along a contour of square shape with rounded corners, provides acoustic guidance of acoustic waves produced by the diaphragm 23 of the loudspeaker 3 fastened to the face in question. The ribs 30 also provide acoustic insulation.

The rib 30 of the top face 25 guides the acoustic waves upwards, and the rib 30 of the front face 27 guides the acoustic waves forwards.

The ribs 30 are integrated directly into the sound box 2, which allows to limit the number of parts to realise the guiding and insulating functions, while optimising the volume of the speaker enclosure 1. Thus, this avoids the use of horns to provide guidance.

Advantageously, the ribs 30 have a height of less than 6 mm. This height allows to optimally reduce the bulk while simplifying the shape of the ribs, insofar as a flare is not necessary with such a height of rib to guide the sound towards the exterior of speaker enclosure 1.

Indeed, the flare is not necessary in the case where the height of the rib is very small compared to the diameter of the loudspeaker considered.

For example, a loudspeaker with a diameter of between 45 to 50 mm is compatible with ribs less than 6 mm in height. In this case, the ribs guide the sound without causing any disturbance.

Figure 6:
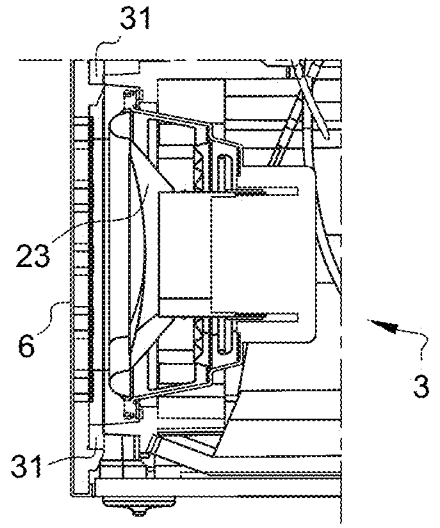
FIG. 6 is a cross-sectional and perspective view of a loudspeaker, along a plane parallel to a longitudinal axis of the loudspeaker.

With reference here to FIG. 6, foams 31 are fastened to the inner walls of the front face 11 and the upper face 10 of the lid 6 of the shell 4. When the lid 6 and the box 2 are assembled, these foams 31 come to rest on the ribs 30 of the front face 27 and of the upper face 25 of the front half-box 15*a*, so as to ensure a sealing between the sound box 2 and the lid 6 around the diaphragm 23, which has the effect of preventing sound waves from passing between the box 2 and the lid 6. Thus, the foams 31 of the lid 6 combined to the ribs 30 of box 2 help to guide the sound towards the outside of the speaker enclosure 1.

Figure 7:
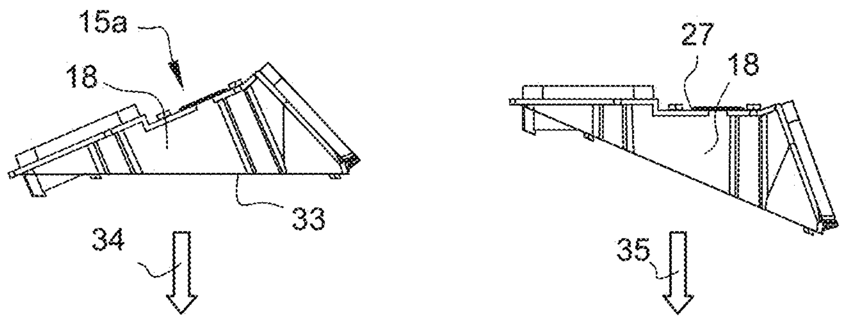
FIG. 7 illustrates the mould-release direction of the front half-box.

Attention is now paid with reference to FIG. 7 to the manufacturing of half-boxes 15. The half-box 15 shown here is the front half-box 15*a*.

The half-boxes 15 are manufactured from plastic material, by a plastic injection process.

It was first envisaged to use a mould-release direction normal to the assembly diagonal 33 of box 2, according to the direction and path shown by the arrow 34. This method is illustrated in the drawing on the left of the FIG. 7.

However, this mould-release direction causes a problem for mould-releasing certain functions, such as, for example, the fastening means allowing to fasten the frames of the loudspeakers 3 to the faces of box 2. These fastening means here, comprise screw barrels of the loudspeakers.

The mould-release direction has therefore, been redirected. The mould-release of each half-box 15 is carried out along the direction and the path shown by the arrow 35.

For each half-box 15, the mould-release direction is therefore perpendicular to a main face from which extend the two lateral faces 18 of the half-box 15. The main face is the front face 27 for the front half-box 15*a*, and the rear face 37 for the rear half-box 15*b*.

The mould-release direction is therefore, not perpendicular to the diagonal 33 of the lateral faces 18, as can be seen in the right-hand drawing of FIG. 7.

This serves to reduce difficulties during mould-release.

Figure 8:
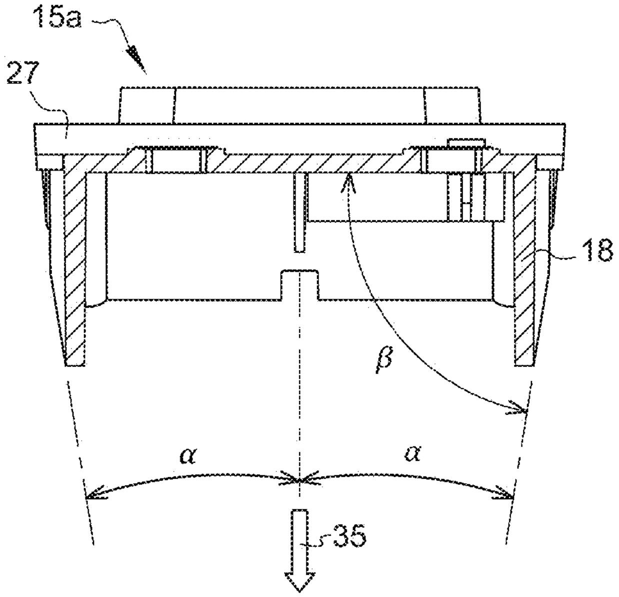
FIG. 8 is the draft angle formed on the front half-box.

With reference to FIG. 8, draft angles α have also been provided. The half-box 15 shown here is the front half-box 15*a*.

For each half-box 15, the outer wall of each lateral face 18 is inclined towards the inside of the half-box 15 to form a draft angle α between said outer wall and an axis X perpendicular to the main face of the half-box 15 (face 27 or 37).

Indeed, during the production of plastic injection parts, the surfaces in the mould-release direction must have a sufficient angle so the parts can be easily removed from the mould. The value of the draft angle is determined in particular by the materials used to manufacture the half-boxes 15.

For example, the front face 27 of the half-box 15*a* forms with at least one of the lateral faces 18 of the half-box an angle β which is between 45° and 90°, preferably between 85° and 90°.

Note that the inner wall of the lateral faces 18 is here inclined towards the outside of the half-box 15 at a certain angle compared to the axis X, preferably less than the angle α.

With reference again to FIG. 3, the box 2 also comprises a seal 40. This is a flat joint, made of a compressible material (foam for example).

The seal 40 is arranged between the two half-boxes 15*a*, 15*b*.

The flat joint 40 comprises a contour portion 41 of generally rectangular shape which, when the box 2 is assembled, is positioned between the free edges of faces of the half-boxes 15.

The contour portion 41 allows to ensure the sealing of the box 2 at the junction of the two assembled half-boxes 15.

Advantageously, the seal 40 also comprises an inner portion 42 that, when the box is assembled, is positioned between free edges of the inner half-partitions 20. The inner portion 42 has a longitudinal shape and extends from a first side (a length) of the contour portion 41 to a second side parallel to the first lateral (another length), perpendicular to the first side and the second side.

The seal 40 therefore, also ensures a sealing of the two acoustic chambers 22*a*, 22*b*.

To be as effective as possible, this seal 40 must be as flat as possible (and therefore, have a constant thickness, without significant differences in thickness).

Note that here, for a half-box 15, the term "free edge" is used to mean an edge that does not belong to another face.

The half-boxes 15*a*, 15*b* are assembled with each other as follows.

The rear half-box 15*b* comprises longitudinal studs 44, here ten in number, distributed according to the length of the free edges of the lateral faces 18 of the rear half-box 15, and extending parallel to them by being positioned at the inner wall of the lateral faces 18.

The front half-box 15*a* comprises complementary tapped barrels.

To assemble the box 2, screws are inserted into the longitudinal studs 44 from the outer wall of the rear face 37 of the rear half-box 15*b*, and are screwed into the tapped barrels.

Note that the joint 40 comprises holes 45 at these studs to allow the screws to pass through.

Referring again to FIG. 4, it can be seen that the speaker enclosure 1 comprises an electrical power supply board 46 which is positioned in the rear half-box 15*b*, at the volume corresponding to the lower chamber 22*b*.

The electrical power supply board 46 is positioned near the arrival of the electrical power supply cable 12.

This board is held inside the half-box 15*b* by screwing. More particularly, it is mechanically constrained by the screws 47 but also by a resting rib 48 which comes to push in the opposite direction to the tightening in order to avoid vibrations which could generate parasitic noise during the functioning of the speaker enclosure 1. Indeed, a simple contact of the board 46 against the rear half-box 15*b* would cause vibrations from this one and therefore, parasitic noise.

Finally, the electrical power supply board 46 is positioned along a plane inclined at 450 compared to each of the rear face 37 and lower face 38 of the half-box 15*b*. A female connector 49 is mounted on the printed circuit of the electrical power supply board 46, perpendicular to it.

This configuration allows to connect the male connector 50, located at the free end of the power supply cable 12, to be connected in two connection positions: a first connection position, corresponding to FIG. 1, in which, when the male connector 50 is connected to the female connector 49, the cable 12 extends parallel to the rear face 7 of the shell 4 near to the male connector 50, and a second connection position, corresponding to FIG. 2, in which, when the male connector 50 is connected to the female connector 49, the cable 12 extends parallel to the lower face 8 of the shell 4 near the male connector 50.

Figure 9:
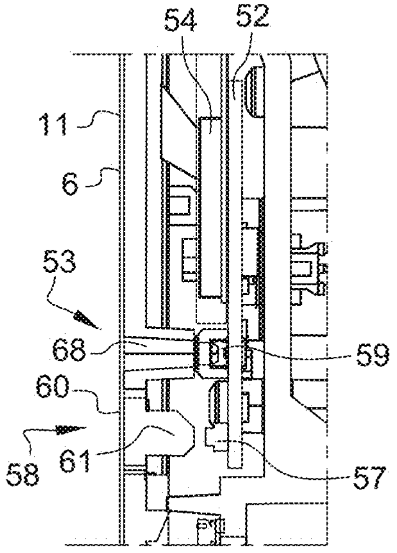
FIG. 9 is a sectional view of the box, of the shell and of the main electronic board, along a plane perpendicular to the board.

With reference to FIGS. 2 and 9, the speaker enclosure 1 comprises a main electronics board 52 that comprises components allowing the speaker enclosure 1 to implement the functions for which it is designed. The electronic board 52 comprises particularly, interface components 53 with the user and a radio frequency communication module, comprising an antenna 54 which allows the speaker enclosure 1 to communicate with external equipment (with a set-top box, for example).

The radio frequency communication module here works according to the Wi-Fi standard, but other standards would be usable, such as Bluetooth, for example.

The speaker enclosure 1 comprises a place to receive the electronic board 52. The place is preferably "front-end".

The front half-box 15*a* comprises a receiving surface 55 (better visible in FIG. 5) arranged to receive the electronic board 52.

The receiving surface 55 here, is located on the outer wall of the front face 27 of the box 2.

The outer wall of the front face 27 comprises first fastening means arranged to fasten the electronic board 52 to said outer wall. The first fastening means here, comprise two tapped holes 56 into which fastening screws are screwed.

This front slot allows the user to have direct access to the interface components 53, arranged at the front of the speaker enclosure 1, which is particularly convenient if the user wishes to install the speaker enclosure 1 against a vertical surface such as a wall.

The front place of the electronic board 52 also allows to limit the electromagnetic interferences on the Wi-Fi antenna 54 outside the box 2, particularly in the direction of the equipment (in this case, the set-top box) to which the speaker enclosure is connected.

Note further, that when the electronic board 52 is positioned in this front slot, the printed circuit of the board 52 acts as a sealing element contributing to improving the acoustic performance of the speaker enclosure 1, without requiring the addition of additional sealing elements.

Attention is particularly paid to interface components 53. Here, these components comprise an actuatable component 57, which can be actuated via a button 58, and a light indicator, in this case a light-emitting diode 59 (LED). The LED 59 allows to indicate to the user the position on the front face 11 of the speaker enclosure 1 of the button 58.

The button 58 allows to manually control the actuatable component 57 to implement a predefined function of the speaker enclosure 1.

Here, this predefined function is the pairing function of the speaker enclosure 1. Preferably, the pairing function will then allow a transmission of the audio signals using wireless technology, for example Wi-Fi or "Bluetooth", to connect the speaker enclosure 1 for example, to an STB type decoder box, so that the sound is transmitted without having to use audio cables.

Here, the actuatable component 57 is a switch, which in this case, is a bistable switch.

The button 58 comprises a deformable surface 60 and an actuating member 61.

The deformable surface 60 is located on the front face 11 of the outer shell 4.

The actuating member 61 is a body located between the switch 57 and the inner wall of the deformable surface 60.

The actuating member 61 extends here from the inner wall of the deformable surface 60.

The deformable surface 60 is formed in the lid 6 by a layer of a deformable material, such as a thermoplastic polymer, preferably Acrylonitrile Butadiene Styrene (ABS), here having a thickness of 2.5 mm.

The deformable surface 60 is obtained here by a cutout made in the front face 11 of the lid 6 of the outer shell 4.

Figure 10:
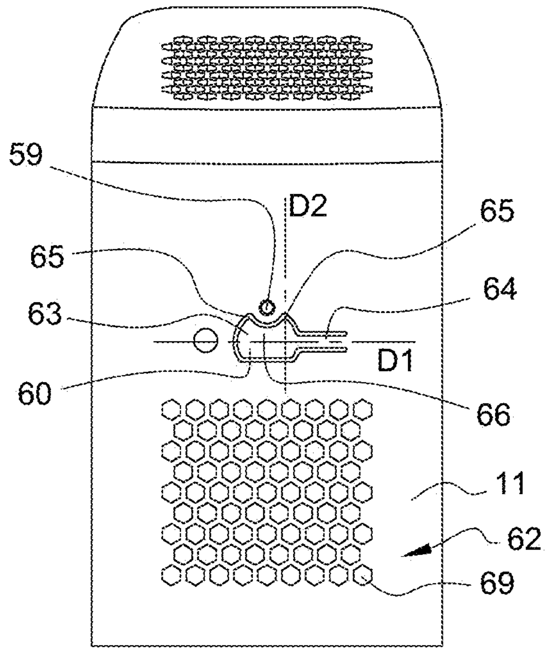
FIG. 10 is a view of the front of the speaker enclosure.

With reference to FIG. 10, the deformable surface 60 comprises a resting area 63 and a tab 64. The tab 64 extends horizontally on the outer wall of the front face 11 of the lid 6 of the outer shell 4, and comprises an end connected to the rest of the lid 6 and a free end from which the resting area zone 63 extends.

The resting area 63 is arranged so that when the user presses on the resting area 63, this one sinks a certain depth, to bring the actuating member 61 towards the switch 57 so as to actuate it and change its state.

The tab 64 here has a width of 3 mm and a length of 11.4 mm, which allow good deformation under the pressure of the user's finger, while ensuring the return into place of the resting area 63 when the pressure ceases.

Thus, the resting area 63 will be able to sink in to a certain depth, here equal to 1.6 mm with respect to the front face 11 of the speaker enclosure 1, which will allow the actuating member 61 to actuate the switch 57 located behind it.

As long as the user presses on the pressing area 63, the button 58 deforms so as to push the switch 57.

Note that the resting area 63 here, has a shape of "cat's head".

The resting area 63 successively comprises, along a first dimension D1, an end portion 65, a central portion 66 and an end portion 65. The central portion 66 is therefore, positioned between the two end portions 65 according to this first dimension D1.

The end portions 65 project from both ends of the central portion 66 according to a second dimension D2 perpendicular to the first dimension D1 and in the same direction (upwards in this case). The two end portions 65 therefore, have a height, along the second dimension D2, greater than that of the central portion 66.

The orthogonal projection of the LED 69 on the front face 11 is positioned between the two end portions 65.

This means that when the speaker enclosure 1 is viewed from the front, the LED 59 is positioned between the two end portions 65 of the resting area 63 and here, above the central portion 66. This particular shape allows to maximise the surface of the resting area 63, by bypassing the light guide 68 of the LED 59 as closely as possible without hindering the emission of light.

Preferably, the front of the speaker enclosure 1 including the resting area 63 (here the outer wall of the front face 11 of the lid 6 of the shell 4) is covered with a fabric, so much so that the user does not see precisely the contours of the resting area 63. The fabric is configured to let the light emitted by the LED 59 pass through, so that the LED 59 is transparently visible through the fabric. The assembly allows the user to know where to press without requiring him to see precisely the contours of the pressing zone 63.

Therefore, here is an equipment 1 comprising an external casing 4 and an electronic board 52 positioned in the external casing near to an inner wall of a face 11 of the external casing, the electronic board comprising an actuatable component 57 and a light indicator 59, the equipment comprising a button 58 having a deformable surface 60 formed on said face of the external casing and an actuating member 61, the button 58 being arranged in such a manner that, when a user presses on the deformable surface 60, this one sinks and the actuating member 61 comes to actuate the actuatable component 57. The deformable surface comprises a resting area 63 comprising two end portions 65 along to the first dimension D1 and a central portion 66 of height along to the second dimension D2 perpendicular to the first dimension D1 less than that of the end portions. The equipment is arranged so that the orthogonal projection of the indicator on the face of the outer casing is positioned between the two end portions 65.

Note here that the actuatable component 57 is not necessarily a switch, that the function is not necessarily a function of pairing the speaker enclosure (it could be a function of activating or deactivating the speaker enclosure, track selection, volume adjustment, etc.).

It is also noted here that the resting area 63 is placed on an acoustic speaker enclosure, but the same principle is applicable to other types of apparatus, such as digital television decoders. In such cases, the assembly comprising the resting area and the light guide may be covered by other light-permeable flexible materials, for example a plasticised film coating instead of the fabric.

It can be seen that the front face 11 of the lid 6 of the outer shell 4 comprises a surface 62 comprising cutouts 69 which each have a hexagonal shape, which defines a honeycomb structure. This surface 62 allows to improve the diffusion of the acoustic waves produced by the diaphragm 23 of the loudspeaker 3*b*. The top face 10 of the lid 6 also includes such a surface.

Attention is now paid to the assembly of the box 2 with the outer shell 4.

The box 2 comprises second fastening means arranged to cooperate with third fastening means of the outer shell 4 to fasten said outer shell to the sound box.

The second fastening means comprise holes 70 (visible in FIG. 5, for example) to position screws. The holes 70 are positioned on the lateral edges of the front face 27 of the front half-box 15*a*, which extend laterally beyond the junction of the lateral faces 18 with the front face 27. The holes here are in a number of six.

The holes 70 comprise three holes positioned at each of the two lateral edges of the front face, distributed along the length of said edges.

The third fixing means comprise six tapped barrels 71 (visible in FIG. 2) which extend horizontally with the inner walls of the lateral faces 9 of the frame 5 of the outer shell 4, near the free edges of said lateral faces 9.

Screws are therefore, positioned in the holes 70 and screwed into the barrels 71 to fasten the box 2 to the frame 5.

It can be seen that the outer walls of the lateral faces 19 of the sound box 2 further comprise grooves 75 which extend from the second fastening means (the holes 70) and which are arranged to prevent the third fastening means of the outer shell from coming into contact with the lateral faces of the sound box.

The grooves 75 therefore allow to facilitate easier insertion of the outer shell 4 on the box 2.

Preferably, the number of grooves 75 is the same as that of holes 70. The grooves 75 are therefore, six in number and are focused on the holes 70. The grooves 75 extend over almost all of the lateral surfaces of the half-boxes 15, with the exception of the front surface serving as a support for the screws. Thus, these grooves have the advantage of avoiding contact with the screw barrels present in the shell.

Given their shapes, the grooves also contribute to the complete stiffening of the box.

Attention is now paid, more specifically, to the outer shell 4.

The outer shell 4 has been designed taking into account all the constraints that apply to the sound box 2 and particularly, the need to associate a sealed acoustic volume of 0.2 L with each loudspeaker 3.

The shell 4 surrounds the sound box 2 while serving as a covering for the speaker enclosure 1.

Due to its two-piece design, the outer shell 4 is modular and can be easily replaced while keeping the same sound box 2.

The outer shell 4 therefore comprises, as just seen, a frame 5 and a lid 6.

The frame 5 is configured to receive the sound box 2, and comprises two lateral faces 9, a rear face 7 connecting the two lateral faces 9, and a lower face 8 (bottom) serving as a support to the other faces, and a front opening 80 formed between the lateral faces 9 and extending to the top of the rear face 7.

The lid 6 is configured to completely cover the front opening 80 of the frame 5.

Thus, the frame 5 forms a receptacle allowing to accommodate the sound box 2. When the lid 6 is fastened on the frame 5, the central sound box 2 is totally protected by the shell 4.

The modular nature of the shell 4 allow to replace it completely or partially (namely, the frame and/or the lid) so as to modify the appearance of the speaker enclosure with an increased freedom, while preserving the acoustic performance of the speaker enclosure 1.

Preferably, the frame 5 and the lid 6 are each formed from a single part, obtained by a plastic injection manufacturing technique (for example, injection of polymer into a mould). In practice, the part forming the lid 6 is less rigid than the part forming the frame 5.

Due of its rather flat and slightly angular shape (angle of around 120°), the part forming the lid 6 behaves like a stretched canvas once subjected to the vibrations produced by the loudspeakers. It must therefore be constrained to avoid deformations during the functioning of the speaker enclosure.

This is why fastening elements, such as clips, support points and two screws are provided on the lid 6 and on the frame 5 to assemble the lid on the frame.

Figure 11:
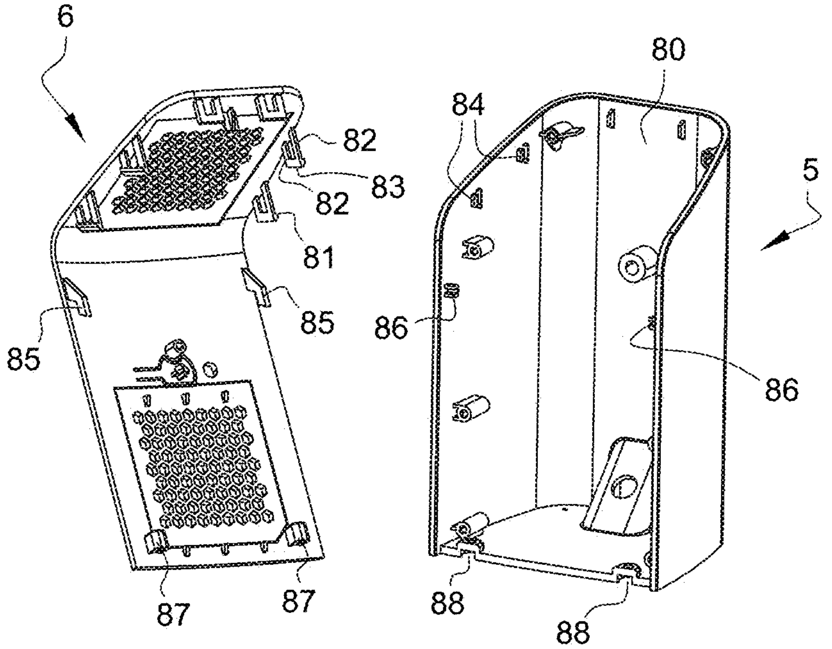
FIG. 11 shows perspective views of the lid and of the shell frame.

With reference to FIG. 11, the lid 6 here comprises first of all elastic nesting elements 81 ("clips"), here six in number, arranged near the free edges of the inner wall of the upper face 10 of the lid 6.

Each element 81 comprises two legs 82 which extend vertically from the inner wall, and a hook 83 carried by the two legs 82 and perpendicular to them.

As for the frame 5, it comprises additional elastic nesting elements 84 ("clip noses"), six in number, arranged near the upper free edges of the lateral faces 9 and of the rear face 7 of the frame 5.

The lid 6 further comprises two hooks 85 each positioned on the upper part and near to one of the free edges of the inner wall of the front face of the lid.

As for the frame 5, it comprises two additional attachment points 86 each positioned on the upper part and near the free edge of the inner wall of one of the lateral faces 9 of the frame 5.

The lid 6 further comprises, two tapped barrels 87 each positioned near the lower part of one of the free edges of the inner wall of the front face 11 of the lid 6.

The frame 5 comprises two screw attachments 88, here two tapped holes, each positioned at one end of the free edge of the inner wall of the lower face 8 of the frame 5.

When assembling the speaker enclosure 1, and therefore, when assembling the lid 6 on the frame 5, the clips 81 couple with the clip noses 84, the hooks 85 couple with the additional attachment points 86, and the tapped barrels 87 coincide with screw attachments 88 formed on the bottom of the frame. Screws are then inserted into the tapped barrels 87 via the holes of the attachments 88, and screwed in.

Advantageously, all the fastening elements described above are obtained directly during the moulding of the lid or of the frame, thus, limiting the addition of additional fastening parts as practiced in the prior art.

Indeed, in the present example, only two screws are mounted through the screw attachments 88 of the frame and the screw barrels 87 of the lid so as to reinforce the fastening of the lid on the frame, all the other fastening elements being integrated directly to the lid and to the frame, which allows an operator of an after-sales service to easily change the lid and/or the frame to modify the appearance of the speaker enclosure.

The speaker enclosure described above has many advantages.

It allows to optimise the technical volume so as to obtain maximum compactness of the speaker enclosure.

The separation of aesthetic aspects and technical functions allows greater freedom to adapt the style of the speaker enclosure for a given technical volume, either by increasing the external dimensions of the speaker enclosure, or by maintaining an equivalent external volume.

The integration and the fastening of the box in an outer shell via simple screws allows to design new coverings quickly.

Indeed, only three constraints are typically present to define a new covering:

- a minimum clearance (of 1 mm for example) between the box and the shell;
- a certain clearance (of 5 mm for example) between the base of each loudspeaker and the shell in order to allow the maximum displacement of the loudspeaker;
- screw barrels (here six) at a position defined to correspond to the passages in the chamber.

Naturally, the invention is not limited to the embodiment described, but comprises any variant entering into the field of the invention, such as defined by the claims.

The shape of the lateral faces of the half-boxes is not necessarily triangular. Any shape is possible, as long as it is compatible with a head-to-tail assembly.

Similarly, the frame and the lid of the shell may have different aspects from those described here.

The invention claimed is:

1. A sound box, intended to form an acoustic speaker enclosure which comprises two loudspeakers, the sound box comprising two half-boxes assembled with each other, each half-box comprising a first end and a second end opposite along a first dimension, the first end having a first height, along a second dimension perpendicular to the first dimension, which is less than a second height of the second end in said second dimension, each half-box further comprising an inner half-partition, the sound box being arranged so that, when it is assembled, the two half-boxes are positioned head-to-tail so that the first end of each half-box is positioned at the second end of the other half-box, and the inner half-boxes extend in line with each other to form an inner partition of the sound box that defines inside the sound box, two acoustic chambers each intended to accommodate one of the two loudspeakers.

2. The sound box according to claim 1, wherein each half-box comprises two lateral faces extending opposite each other and parallel to the first dimension and to the second dimension, each lateral face of each half-box having a triangular shape, the sound box thus, comprising two lateral faces of rectangular shape and each formed by two lateral faces of the two half-boxes.

3. The sound box according to claim 2, wherein each half-box is manufactured by moulding, said half-box being arranged so that its mould-release takes place in a mould-release direction perpendicular to a main face of the half-box from which the two lateral faces of the half-box extend.

4. The sound box according to claim 3, wherein, for each half-box, the outer wall of each lateral face is inclined towards the inside of the half-box to form a draft angle ($\alpha$) between said outer wall and an axis perpendicular to said main face.

5. The sound box according to claim 1, wherein, when the sound box is in a nominal position, the inner wall extends in a horizontal plane and thus, defines an upper acoustic chamber a and a lower acoustic chamber, an upper face of the sound box being arranged so that a diaphragm of the loudspeaker of the upper acoustic chamber can extend at said upper face, and a front face of the sound box being arranged so that a diaphragm of the loudspeaker of the lower acoustic chamber can extend to said front face.

6. The sound box according to claim 1, wherein one of the half-boxes comprises two faces each arranged so that a diaphragm of one of the loudspeakers may extend at said face.

7. The sound box according to claim 1, comprising, for each loudspeaker, a face arranged so that a diaphragm of said loudspeaker may extend at said face, said face comprising an opening through which the diaphragm can be in acoustic communication with the outside of the box, an outer wall of said face further comprising a rib which extends around the opening so as to provide acoustic guidance of acoustic waves produced by said diaphragm.

8. The sound box according to claim 1, comprising a seal, made of a compressible material, arranged at the joint of the half-boxes when those are assembled, the seal comprising a contour portion positioned between free edges of faces of the half-boxes, and an inner portion positioned between free edges of the inner half-partitions, so that the seal ensures a sealing of the box at the joint of the two half-boxes, and at the two acoustic chambers.

9. The sound box according to claim 1, comprising a front face having an outer wall comprising a receiving surface arranged to receive an electronic board, and first fastening means arranged to fasten the electronic board to said outer wall.

10. The sound box according to claim 1, further comprising second fastening means arranged to cooperate with third fastening means of an outer shell to fasten said outer shell to the sound box.

11. The sound box according to claim 10, comprising a front face having lateral edges on which the second fastening means are formed, outer walls of the lateral faces of the sound box further comprising grooves which extend from the second fastening means and which are arranged to prevent the third fastening means of the outer shell from coming into contact with the lateral faces of the sound box, and to stiffen said sound box.

12. A speaker enclosure comprising the sound box according to claim 1, as well as the two loudspeakers.

13. The speaker enclosure according to claim 12, further comprising an outer shell and a second fastening means arranged to cooperate with third fastening means of the outer shell to fasten said outer shell to the sound box.

14. The speaker enclosure according to claim 13, wherein the outer shell comprises a frame forming a rear face, a bottom face and lateral faces of the speaker enclosure, and a lid forming a top face and a front face of the speaker enclosure.

15. The speaker enclosure according to claim 12, comprising the sound box comprising a front face having an outer wall comprising a receiving surface arranged to receive an electronic board, and first fastening means arranged to fasten the electronic board to said outer wall, the speaker enclosure also comprising the electronic board, the electronic board comprising interface components with a user.

16. The speaker enclosure according to claim 15, wherein the interface components comprise an actuatable component, and wherein the speaker enclosure comprises a button arranged to actuate the actuatable component, the button comprising a deformable surface formed on the outer shell and comprising a resting area arranged so that when the user presses on the resting area, this one sinks and allows to actuate the actuatable component to implement a predefined function.

17. The speaker enclosure according to claim 16, wherein the interface components further comprise a light indicator indicating a position of the button on the outer shell, and wherein the resting area comprises a central portion and two end portions according to a first dimension, the two end portions having a height according to a second dimension perpendicular to the first dimension greater than that of the central portion, the speaker enclosure being arranged so that an orthogonal projection of the light indicator on the outer shell is positioned between the two end portions.

18. The speaker enclosure according to claim 16, wherein the deformable surface is obtained by a cutout made in the outer shell, the deformable surface comprising a tab having one end connected to the rest of the outer shell and a free end from which the resting area extends.

* * * * *